United States Patent
Tseng et al.

(10) Patent No.: US 8,797,262 B2
(45) Date of Patent: Aug. 5, 2014

(54) METHOD OF SENSING MOTION IN THREE-DIMENSIONAL SPACE

(75) Inventors: Kui-Chang Tseng, Kaohsiung (TW); Yi-Hsun Hsieh, Penghu County (TW); Ren-Yuan Yu, Hsinchu County (TW); Hao-Chieh Yeh, Pingtung County (TW)

(73) Assignee: Prolific Technology Inc., Nan Kang, Taipei (TW)

( * ) Notice: Subject to any disclaimer, the term of this patent is extended or adjusted under 35 U.S.C. 154(b) by 704 days.

(21) Appl. No.: 12/748,461

(22) Filed: Mar. 29, 2010

(65) Prior Publication Data

US 2011/0181505 A1    Jul. 28, 2011

(30) Foreign Application Priority Data

Jan. 26, 2010   (TW) ............................... 99102073 A (51) Int. Cl.
  G06F 3/033   (2013.01)
  G09G 5/08    (2006.01)
  G09G 5/00    (2006.01)
  G01P 15/00   (2006.01)
  G06F 3/0346  (2013.01)

(52) U.S. Cl.
  CPC ................................ *G06F 3/0346* (2013.01)
  USPC .......................... 345/157; 702/141; 345/156

(58) Field of Classification Search
  USPC ........................................................ 345/157
  See application file for complete search history.

(56) References Cited

U.S. PATENT DOCUMENTS

| | | | |
|---|---|---|---|
| 5,898,421 | A | 4/1999 | Quinn |
| 2007/0214886 | A1 | 9/2007 | Sheynblat |
| 2008/0042973 | A1* | 2/2008 | Zhao et al. .................... 345/156 |
| 2008/0255795 | A1* | 10/2008 | Shkolnikov .................. 702/141 |
| 2009/0303204 | A1* | 12/2009 | Nasiri et al. ................. 345/184 |

FOREIGN PATENT DOCUMENTS

| | | |
|---|---|---|
| TW | 200538751 | 12/2005 |
| TW | 200639406 | 11/2006 |
| TW | 200825867 | 6/2008 |

\* cited by examiner

*Primary Examiner* — Charles V Hicks
(74) *Attorney, Agent, or Firm* — Winston Hsu; Scott Margo (57) ABSTRACT

An accelerometer and a gyroscope are disposed in a device. When the device rotates in a 3D space, angle of the device relative to gravity is calculated, movement of the device relative to gravity is calculated during the rotation process, and a real trace of the device is obtained in the 3D space.

6 Claims, 6 Drawing Sheets

METHOD OF SENSING MOTION IN THREE-DIMENSIONAL SPACE

BACKGROUND OF THE INVENTION

1. Field of the Invention

The present invention relates to a method of sensing motion in three-dimensional (3D) space, and more particularly, to a method of removing rotational influence when a device is moved, converting coordinate axes of the device into coordinate axes of gravity, and sensing the motion of the device in the 3D space.

2. Description of the Prior Art

When a device, such as a 3D mouse, is moved, a user may make slight rotations of the device unconsciously. Because a three-axis accelerometer installed in the device is very sensitive, values of the three-axis accelerometer may be composed of a gravity component and acceleration of a hand of the user. Due to the acceleration of the hand, using a traditional coordinate algorithm to calculate the values of the three-axis accelerometer may not generate a correct motion trajectory of the device in the 3D space. Due to an assumption that the values of the three-axis accelerometer are only influenced by gravity in the traditional coordinate algorithm, calculated values of the three-axis accelerometer relative to gravity generated through the traditional coordinate algorithm may have errors, so that the device cannot output a motion trajectory relative to gravity precisely.

Figure 1:
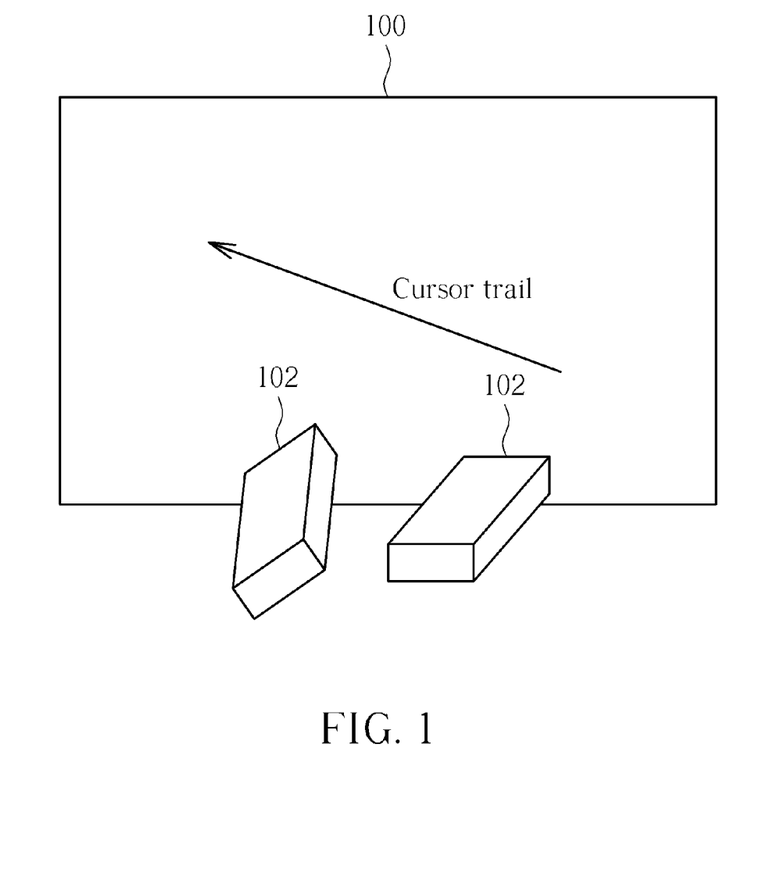
FIG. 1 is a diagram illustrating a device which projects a cursor trail on a screen according to the prior art.

Please refer to FIG. 1. FIG. 1 is a diagram illustrating a device 102 which projects a cursor trail on a screen 100 according to the prior art. As shown in FIG. 1, the device 102 moves and rotates to the left. Because the device 102 is unable to convert its motion trajectory from the coordinate axes of the device 102 into the coordinate axes of gravity, the cursor trail, which is projected on the screen 100 by the device 102, follows the rotation of the device 102 to change its direction of motion. That is to say, the cursor trail not only moves left but left and up.

"INITIAL SENSING INPUT APPARATUS" is disclosed in Taiwan Patent Publication No. 200639406. Regardless of whether an apparatus is static or moving, the apparatus and method disclosed in this prior art cannot convert coordinate axes of the apparatus into the coordinate axes of gravity. Therefore, a motion output in this prior art correspond to motion along the coordinate axes of the apparatus, not to displacement along the coordinate axes of gravity. That is to say, the motion output is changed corresponding to the relative coordinates between the apparatus and gravity.

"FREE SPACE POINTING DEVICES AND METHODS" is disclosed in Taiwan Patent Publication No. 200538751. A device and method disclosed in this prior art can only convert the coordinate axes of the device into the coordinate axes of gravity when the device is static or slowly moving. So, this prior art cannot convert the coordinate axes of the device into the coordinate axes of gravity when the device moves. That is to say, a motion output of the device is incorrect if the relative coordinates between the device and gravity change.

"Gyroscopic pointer and method" is disclosed in U.S. Pat. No. 5,898,421. The method in this prior art cannot calculate a relative relationship between an accelerometer and a gyroscope, so this prior art needs more than two gyroscopes to calculate information required for performing coordinate conversion.

SUMMARY OF THE INVENTION

An embodiment of the present invention provides a method of sensing motion in a 3D space. The method comprises reading a plurality of values of at least one accelerometer of a device in three axes; reading a plurality of values of at least one gyroscope of the device in two axes; using the plurality of values of the accelerometer in the three axes and the plurality of values of the gyroscope in the two axes to generate a rotating radius of the device; using the rotating radius of the device and the plurality of values of the gyroscope in the two axes to generate tangential accelerations of the device in the two axes; and using the plurality of values of the accelerometer in the two axes, the tangential accelerations of the device in the two axes, the plurality of values of the gyroscope in the two axes, and the rotating radius of the device to generate a motion output of the device.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
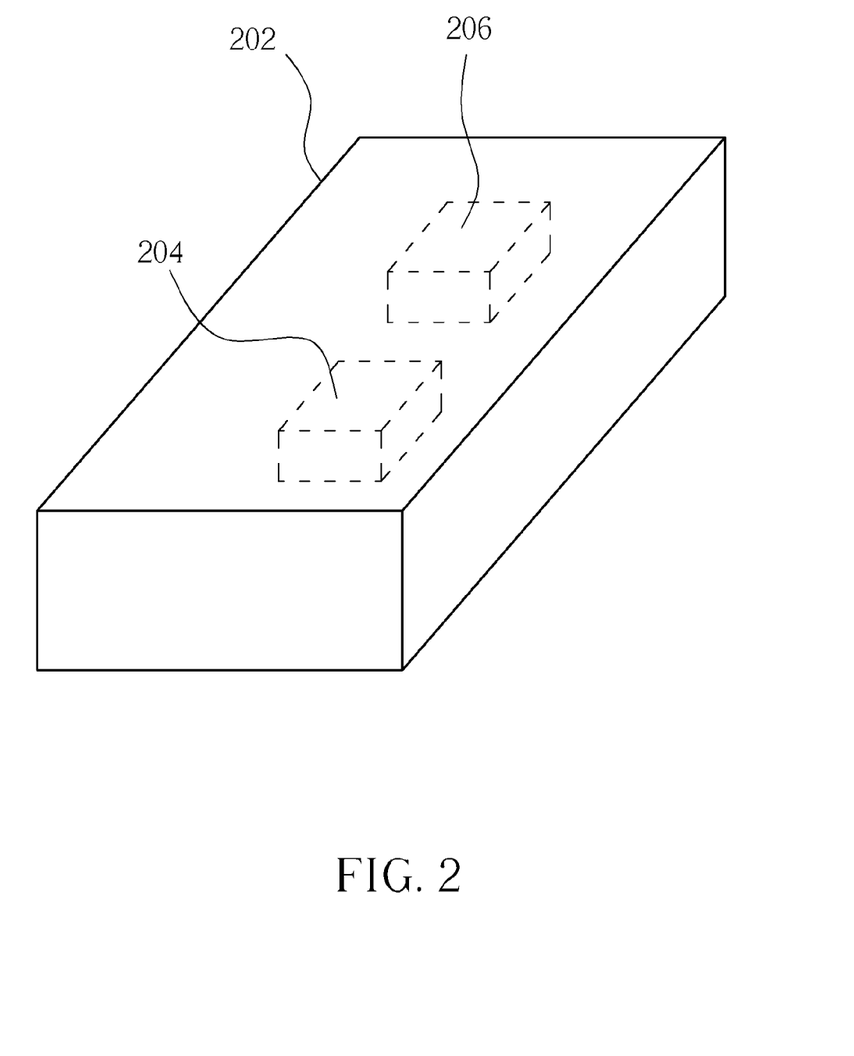
FIG. 2 is a diagram illustrating a device.

FIG. 2 is a diagram illustrating a device 202. A three-axis accelerometer 204 and a two-axis gyroscope 206 may be disposed in the device 202. When the device 202 moves in a 3D space, the three-axis accelerometer 204 and the two-axis gyroscope 206 sense accelerations and angular velocity of the device 202.

Figure 3:
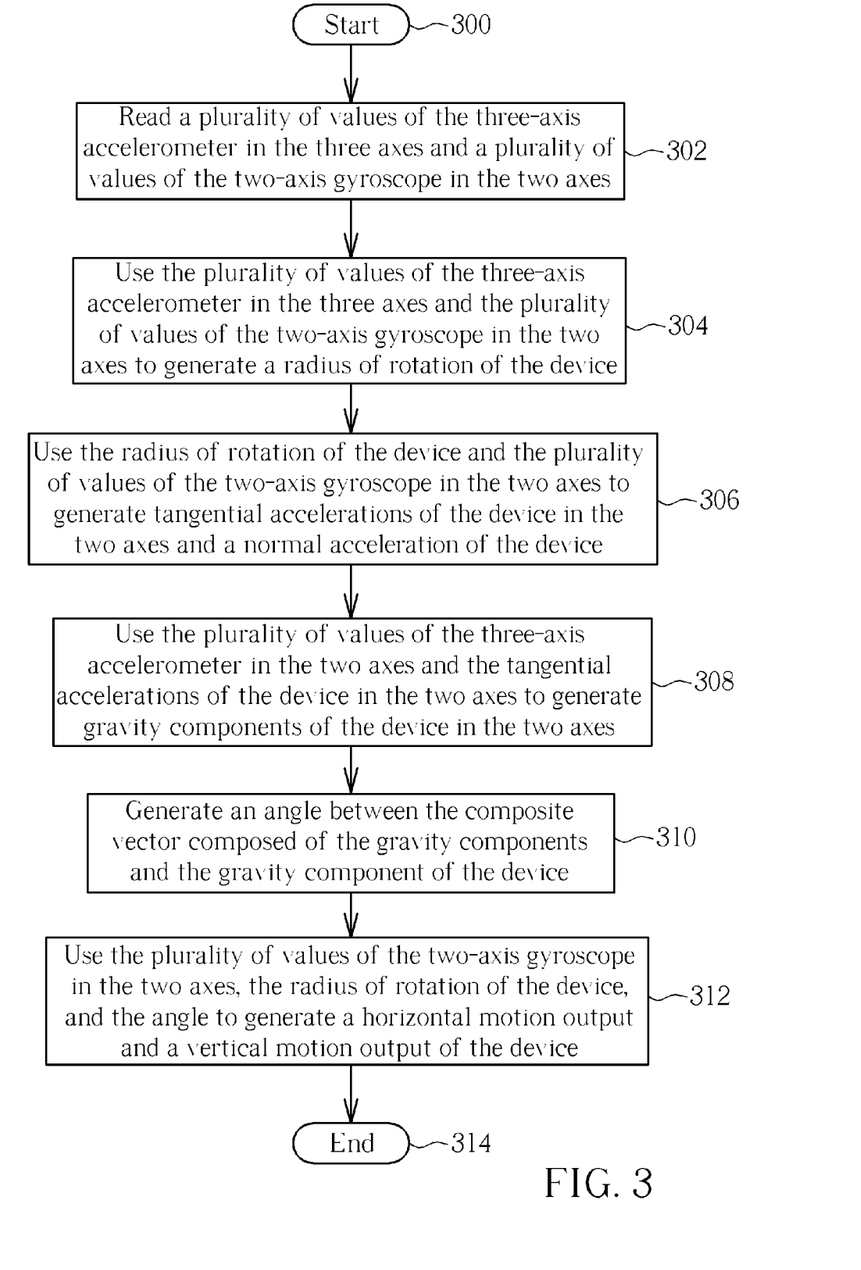
FIG. 3 is a flowchart illustrating a method of sensing motion in a 3D space according to an embodiment of the present invention.
Figure 4:
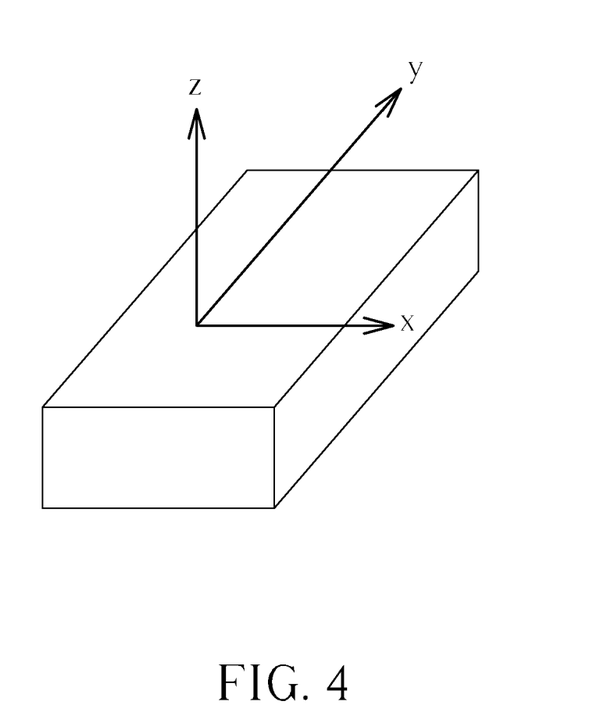
FIG. 4 is a diagram illustrating three coordinate axes of the device.

Please refer to FIG. 3 and FIG. 4. FIG. 3 is a flowchart illustrating a method of sensing motion in a 3D space according to an embodiment of the present invention. FIG. 4 is a diagram illustrating three coordinate axes of the device 202. Coordinate axes of the three-axis accelerometer 204 and the two-axis gyroscope 206 are the same as the coordinate axes of the device 202. FIG. 3 uses the device 202, the three-axis accelerometer 204 and the two-axis gyroscope 206 in FIG. 2 to illustrate the method of sensing motion in a 3D space. Detailed steps are as follows:

Step 300: Start.

Step 302: Read a plurality of values $A_x$, $A_y$, $A_z$ of the three-axis accelerometer 204 in the three axes and a plurality of values $w_x$, $w_z$ of the two-axis gyroscope 206 in the two axes.

Step 304: Use the plurality of values $A_x$, $A_y$, $A_z$ of the three-axis accelerometer 204 in the three axes and the plurality of values $w_x$, $w_z$ of the two-axis gyroscope 206 in the two axes to generate a radius r of rotation of the device 202.

Step 306: Use the radius r of rotation of the device 202 and the plurality of values $w_x$, $w_z$ of the two-axis gyroscope 206 in the two axes to generate tangential accelerations $A_{rx}$, $A_{rz}$ of the device 202 in the two axes and a normal acceleration $A_{ry}$ of the device 202.

Step 308: Use the plurality of values $A_x$, $A_z$ of the three-axis accelerometer 204 in the two axes and the tangential accelerations $A_{rx}$, $A_{rz}$ of the device 202 in the two axes to generate gravity components $G_x$, $G_z$ of the device 202 in the two axes.

Step 310: Use the gravity components $G_x$, $G_z$ of the device 202 in the two axes to generate an angle θ between a composite vector $G_{xz}$ composed of the gravity components $G_x$, $G_z$ and the x axis, wherein $$\theta = \arctan\frac{G_z}{G_x}.$$

Step 312: Use the plurality of values $w_x$, $w_z$ of the two-axis gyroscope 206 in the two axes, the radius r of rotation of the device 202, and the angle θ to generate a horizontal motion output and a vertical motion output of the device 202, wherein the horizontal motion output and the vertical motion output are relative to the gravity axis.

Step 314: End.

In Step 302, $A_x$ is an acceleration detected by a x axis accelerometer of the three-axis accelerometer 204, $A_y$ is an acceleration detected by a y axis accelerometer of the three-axis accelerometer 204, $A_z$ is an acceleration detected by a z axis accelerometer of the three-axis accelerometer 204, $w_z$ is an angular velocity of rotation of the device 202 about the z axis detected by a z axis gyroscope of the two-axis gyroscope 206, and $w_x$ is an angular velocity of rotation of the device 202 about the x axis detected by an x axis gyroscope of the two-axis gyroscope 206.

In Step 304, when the device 202 rotates about the y axis, the values $A_x$, $A_z$ of the three-axis accelerometer 204 in the x, z axes include acceleration components and gravity components of the device 202 in the tangential direction, and the value $A_y$ of the three-axis accelerometer 204 in the y axis includes an acceleration component and a gravity component of the device 202 in the normal direction. The two angular velocities $w_x$, $w_z$ of the two-axis gyroscope 206 in the x, z axes are multiplied by the radius r of rotation of the device 202 respectively to generate the tangential accelerations $A_{rx}$, $A_{rz}$ of the device 202 in the x, z axes. Using the plurality of values $A_x$, $A_y$, $A_z$ of the three-axis accelerometer 204 in the three axes, the tangential accelerations $A_{rx}$, $A_{rz}$ of the device 202 in the x, z axes, the normal acceleration $A_{ry}$ of the device 202 in the y axis, and the gravity G, the radius r of rotation of the device 202 is generated as follows:

$$A_{rx} = r \times \frac{\Delta w_z}{\Delta t}, \quad (1)$$

$$A_{rz} = r \times \frac{\Delta w_x}{\Delta t}, \quad (2)$$

and $$A_{ry} = r \times (w_x^2 + w_z^2), \quad (3)$$

where Δt is a sampling period both of the three-axis accelerometer 204 and the two-axis gyroscope 206, $\Delta w_z$ is a difference of the angular velocity of rotation of the device 202 about the z axis during the sampling period Δt, and $\Delta w_x$ is a difference of the angular velocity of rotation of the device 202 about the x axis during the sampling period Δt.

A square of gravity is equal to a sum of a square of a difference between $A_x$ and $A_{rx}$, a square of a difference between $A_z$ and $A_{rz}$, and a square of a difference between $A_y$ and $A_{ry}$ as follows:

$$(A_x - A_{rx})^2 + (A_z - A_{rz})^2 + (A_y - A_{ry})^2 = G^2 \quad (4)$$

Substituting equations (1), (2), (3) into equation (4) yields:

$$\left(A_x - r \times \frac{\Delta w_z}{\Delta t}\right)^2 + \left(A_z - r \times \frac{\Delta w_x}{\Delta t}\right)^2 + (A_y - r(w_z^2 + w_x^2))^2 = G^2 \quad (5)$$

So, the radius r of rotation of the device 202 may be generated through equation (5).

In Step 306, substituting the radius r and the plurality of values $w_x$, $w_z$ of the two-axis gyroscope 206 into equations (6), (7), the tangential accelerations $A_{rx}$, $A_{rz}$ of the device 202 are generated in the two axes:

$$A_{rx} = r \times \frac{\Delta w_z}{\Delta t} \quad (6)$$

$$A_{rz} = r \times \frac{\Delta w_x}{\Delta t} \quad (7)$$

In Step 308, because the values $A_x$, $A_z$ of the three-axis accelerometer 204 in the x, z axes include the acceleration components and the gravity components of the device 202 in the tangential direction, the gravity components $G_x$, $G_z$ can be generated after subtracting the tangential accelerations $A_{rx}$, $A_{rz}$ of the device 202 from the plurality of values $A_x$, $A_z$ of the three-axis accelerometer 204 in the x, z axes:

$$G_x = A_x - A_{rx} \quad (8)$$

$$G_z = A_z - A_{rz} \quad (9)$$

where $G_x$ is a gravity component along the x axis, and $G_z$ is a gravity component along the z axis.

Figure 5:
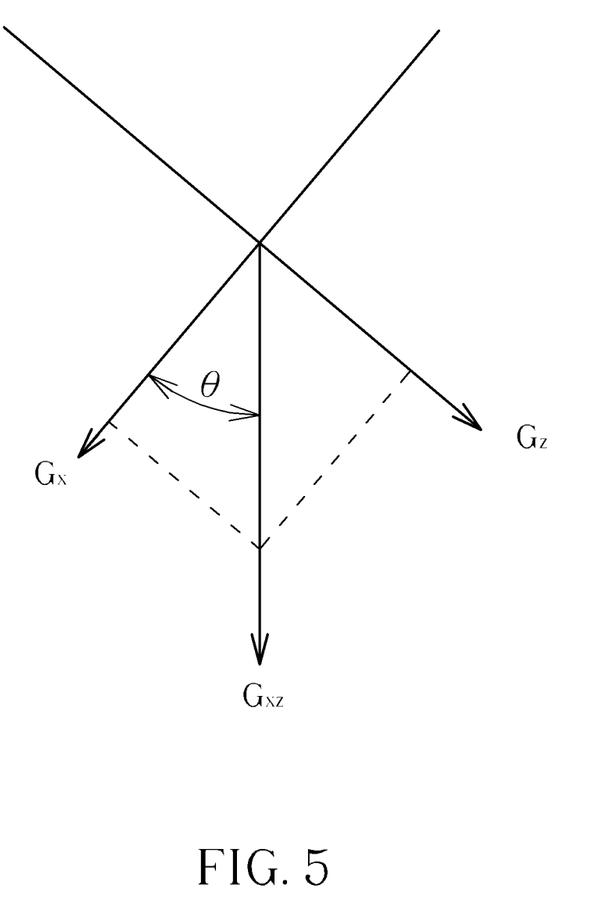
FIG. 5 is a diagram illustrating a relationship between the gravity components $G_x$, $G_z$ and the composite vector $G_{xz}$ composed of the gravity components $G_x$, $G_z$.

Please refer to FIG. 5. FIG. 5 is a diagram illustrating a relationship between the gravity components $G_x$, $G_z$ and the composite vector $G_{xz}$ composed of the gravity components $G_x$, $G_z$. In Step 310, the gravity components $G_x$, $G_z$ of the device 202 along the x, z axes may be used to generate the angle θ between the composite vector $G_{xz}$ and the x axis during motion of the device 202, where θ=arctan($G_z/G_x$).

In Step 312, the angle θ may be used to convert the coordinate axes of the device 202 into the coordinate axes of the gravity axis. Thus the horizontal motion output and the vertical motion output are obtained relative to gravity. The horizontal motion output and the vertical motion output may be represented as displacement, velocity, and/or a combination thereof. The horizontal motion output and the vertical motion output shown in equations (10), (11) are represented as displacement. The horizontal motion output and the vertical motion output shown in equations (12), (13) are represented as velocity. The equations (10), (11), (12), and (13) are as follows:

$$\omega_z r \times \Delta t \times \sin\theta + \omega_x r \times \Delta t \times \cos\theta \quad (10)$$

$$\omega_z r \times \Delta t \times \cos\theta + \omega_x r \times \Delta t \times \sin\theta \quad (11)$$

$$\omega_z r \times \sin\theta + \omega_x r \times \cos\theta \quad (12)$$

$$\omega_z r \times \cos\theta + \omega_x r \times \sin\theta \quad (13)$$

In the above, the horizontal motion output and the vertical motion output shown in equations (10), (11), respectively, and/or in equations (12), (13), respectively, are motion outputs of the device 202 during the sampling period Δt.

Figure 6:
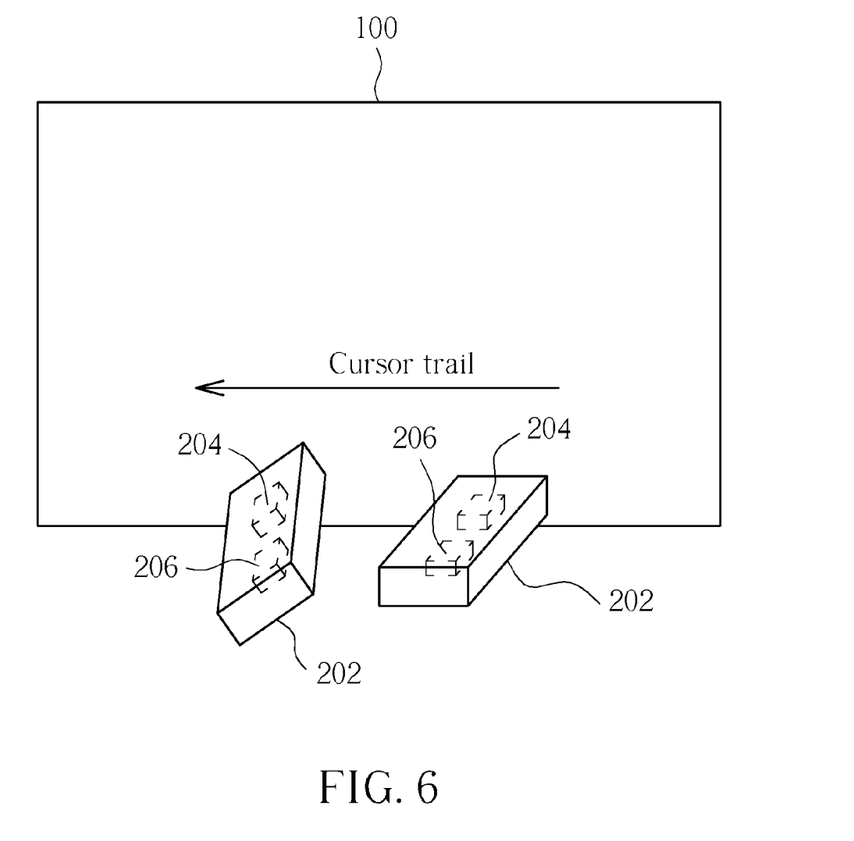
FIG. 6 is a diagram illustrating use of the device in FIG. 2 and the method in FIG. 3 to generate the cursor trail on the screen.

Please refer to FIG. 6. FIG. 6 is a diagram illustrating use of the device 202 in FIG. 2 and the method in FIG. 3 to generate the cursor trail on the screen 100. As shown in FIG. 6, when the device 202 moves in the 3D space, the three-axis accelerometer 204 and the two-axis gyroscope 206 may detect the acceleration and the angular velocity of the device 202. Then, the method disclosed in FIG. 3 may be used to correct errors resulting from the hand of the user rotating the device 202 unconsciously. Therefore the device 202 can make the cursor trail on the screen 100 follow the motion trajectory of the device 202 relative to the coordinate axes of gravity after converting the coordinate axes of the device 202 into the coordinate axes of gravity, so that the device 202 can correct mistakes of the cursor trail on the screen 100 due to the hand of the user rotating the device 202 unconsciously. Thus the device 202 can project the cursor trail on the screen 100 relative to gravity precisely. In addition, the three-axis accelerometer 204 may be three accelerometers each outputting a value of one axis, an accelerometer outputting values of two axes cooperating with an accelerometer outputting a value of one axis, and/or an accelerometer outputting values of three axes; the two-axis gyroscope 206 may be two gyroscopes each outputting a value of one axis, and/or a gyroscope outputting values of two axes.

In summary, the embodiments of the present invention can be used to calculate a relationship between the coordinate axes of the device and the coordinate axes of gravity at any time. In an application of the device to free space inertial motion, the embodiments of the present invention make the device output a motion trajectory relative to the coordinate axes of gravity instead of outputting the motion trajectory relative to the coordinate axes of the device. So, the embodiments of the present invention can avoid outputting an abnormal motion trajectory due to a variation of the relative coordinates between the device and gravity. In addition, the embodiments of the present invention can correct the errors resulting from the hand of the user rotating the device unconsciously through a relationship between the accelerometer and the gyroscope. Therefore, the method described only uses the three-axis accelerometer and the two-axis gyroscope to generate information relevant to coordinate conversion. Then, the device can output the motion trajectory relative to gravity.

Those skilled in the art will readily observe that numerous modifications and alterations of the device and method may be made while retaining the teachings of the invention.

What is claimed is:

1. A method of sensing motion in a three-dimensional (3D) space, the method comprising:

reading a plurality of values of at least one accelerometer contained in a device in three axes, wherein the three axes are three axes of a three-dimensional coordinate system in the 3D space;

reading a plurality of values of at least one gyroscope of the device in two axes of the three axes;

using the plurality of values of the accelerometer in the three axes and the plurality of values of the gyroscope in the two axes to generate a rotation radius of the device according to the following equation:

$$\left(A_x - r \times \frac{\Delta w_z}{\Delta t}\right)^2 + \left(A_z - r \times \frac{\Delta w_x}{\Delta t}\right)^2 + (A_y - r(w_z^2 + w_x^2))^2 = G^2;$$

wherein $A_x$ is an x axis acceleration component detected by the accelerometer;

$A_y$ is a y axis acceleration component detected by the accelerometer;

$A_z$ is a z axis acceleration component detected by the accelerometer;

$w_z$ is Z-axis angular velocity detected by the gyroscope;

$w_x$ is X-axis angular velocity detected by the gyroscope;

Δt is a sampling period both of the accelerometer and the gyroscope;

$\Delta w_z$ is a difference of Z-axis angular velocity during the sampling period Δt;

$\Delta w_x$ is a difference of X-axis angular velocity during the sampling period Δt;

G is gravity; and r is the rotation radius of the device;

using the rotation radius of the device and the plurality of values of the gyroscope in the two axes to generate tangential accelerations of the device in the two axes; and using a plurality of values of the accelerometer in the two axes, the tangential accelerations of the device in the two axes, the plurality of values of the gyroscope in the two axes, and the rotation radius of the device to generate a motion output of the device, comprising:

using the plurality of values of the accelerometer in the two axes and the tangential accelerations of the device in the two axes to generate gravity components of the device in the two axes;

using the gravity components of the device in the two axes to obtain an angle between a composite vector composed of the gravity components in the two axes and one axis of the two axes; and using the plurality of values of the gyroscope in the two axes, the rotation radius of the device, and the angle to generate a horizontal motion output and a vertical motion output of the device.

2. The method of claim 1, wherein using the rotation radius of the device and the plurality of values of the gyroscope in the two axes to generate the tangential accelerations of the device in the two axes is performed according to:

$$A_{rx} = r \times \frac{\Delta w_z}{\Delta t};$$

and $$A_{rz} = r \times \frac{\Delta w_x}{\Delta t};$$

wherein $A_{rx}$ is tangential acceleration in the x axis of the device; and $A_{rz}$ is tangential acceleration in the z axis of the device.

3. The method of claim 2, wherein using the plurality of values of the accelerometer in the two axes and the tangential accelerations of the device in the two axes to generate the gravity components of the device in the two axes is performed according to:

$$G_x = A_x - A_{rx}; \text{ and}$$

$$G_z = A_z - A_{rz};$$

wherein $G_x$ is a gravity component along the x axis; and $G_z$ is a gravity component along the z axis.

4. The method of claim 3, wherein using the gravity components of the device in the two axes to obtain the angle between the composite vector composed of the gravity components in the two axes and the axis of the two axes, the angle is performed according to:

$$\theta = \arctan\frac{G_z}{G_x};$$

wherein $\theta$ is the angle between the composite vector composed of the gravity components in the two axes and x axis.

5. The method of claim 4, wherein using the plurality of values of the gyroscope in the two axes, the rotation radius of the device, and the angle to generate the horizontal motion output and the vertical motion output of the device are comprised of:
  obtaining the horizontal motion output as $\omega_z \times r \times \Delta t \times \sin\theta + \omega_x \times r \times \Delta t \times \cos\theta$; and
  obtaining the vertical motion output as $\omega_z \times r \times \Delta t \times \cos\theta + \omega_x \times r \times \Delta t \times \sin\theta$.

6. The method of claim 4, wherein using the plurality of values of the gyroscope in the two axes, the rotation radius of the device, and the angle to generate the horizontal motion output and the vertical motion output of the device are comprised of:
  obtaining the horizontal motion output as $\omega_z \times r \times \sin\theta + \omega_x \times r \times \cos\theta$; and
  obtaining the vertical motion output as $\omega_z \times r \times \cos\theta + \omega_x \times r \times \sin\theta$.

* * * * *